Sept. 7, 1926.  
M. WILLENE  
CLUTCH PLATE  
Filed March 12, 1926  
1,598,795
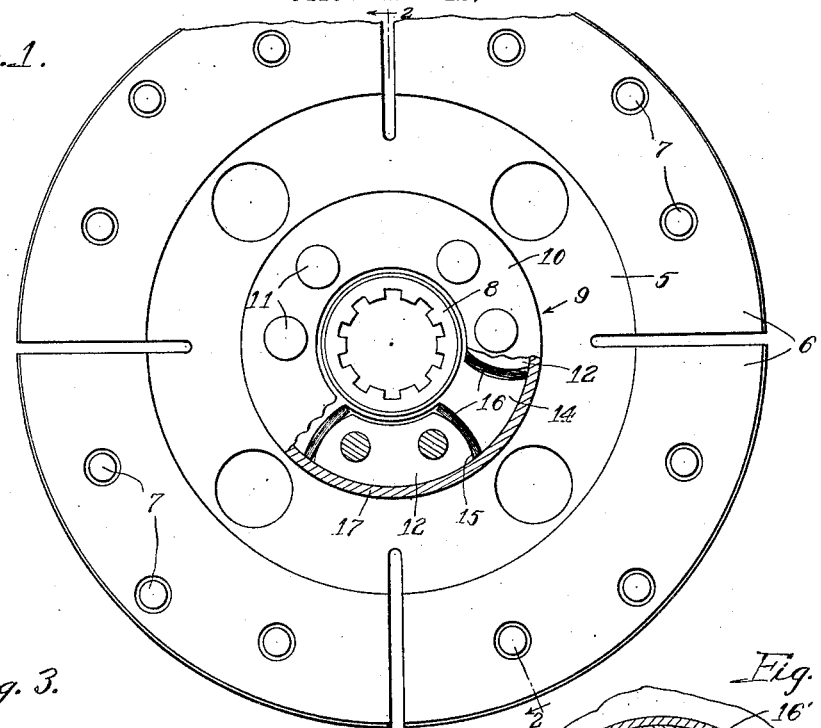
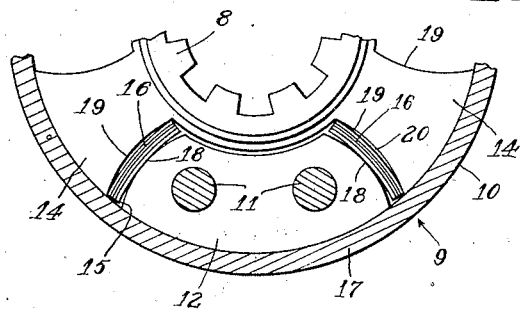
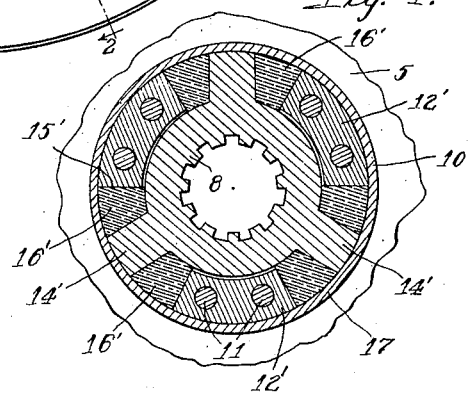
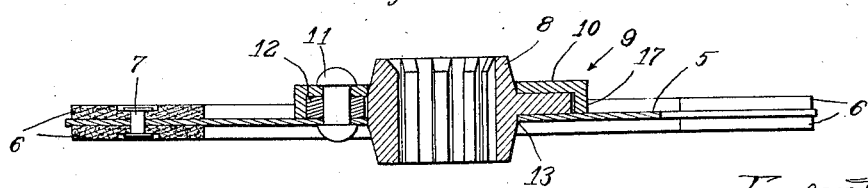
Inventor:
Martin Willene.
By Wilson & McCanna
Attys.

Patented Sept. 7, 1926.

1,598,795

UNITED STATES PATENT OFFICE.

MARTIN WILLENE, OF ROCKFORD, ILLINOIS, ASSIGNOR TO ROCKFORD DRILLING MACHINE COMPANY, OF ROCKFORD, ILLINOIS, A CORPORATION OF ILLINOIS.

CLUTCH PLATE.

Application filed March 12, 1926. Serial No. 94,183.

This invention relates to clutches and more particularly friction disk clutches suited especially to the requirements of motor vehicles.

The principal object of the present invention is to provide a more quietly operating transmission by providing a clutch plate the drive collar of which has a resilient driving connection therewith to eliminate vibration and the consequent noise and eventual wear and tear in the operation thereof and thereby afford a smoother and more quietly operating clutch and motor.

More specifically stated, my invention provides a clutch plate the central splined collar of which is provided with radiating teeth or spurs operating inside a hollow hub on the clutch plate between spaced blocks or cogs within the hub between which and the teeth of the collar resilient cushioning elements are disposed to afford the desired elasticity in the clutch plate and overcome vibration in the motor which otherwise develops. A special feature of the present invention consists in the provision of leaf springs, or, more particularly, laminated leaf springs as the resilient cushioning elements which have been found to give ideal performance, are practically unbreakable and very durable, and permit of a very compact and simple construction as well as being economical to use. Still another feature consists in the provision of a sheet metal annular shell riveted with the aforesaid blocks to the plate to form a rigid and compact hub structure wherein the leaf springs are securely retained in position and whereby the collar and the plate are held in assembled relation.

The invention is more fully described in the course of the following specification having reference to the accompanying drawings, wherein—

Figure 1 is a face view of a friction clutch disk embodying the present novel hub construction a portion of which is broken away more clearly to illustrate the internal structure thereof;

Fig. 2 is a cross-section taken on the line 2—2 of Fig. 1, looking in the direction of the arrows;

Fig. 3 is an enlarged detail partly in section and partly in elevation of a portion of the hub structure appearing in Fig. 1; and Fig. 4 is a sectional detail of a modified form of hub structure operating on a similar principle to that shown in Figs. 1 to 3. Throughout the views the same or similar reference numerals are applied to corresponding parts.

In friction clutches of the present type, motion is transmitted from a driving shaft or motor to the driven clutch disk or plate 5 usually by two oppositely disposed pressure plates brought together under spring pressure to drive the plate by frictional engagement about the rim portion, where the friction pads 6 are provided fixed to the plate in any suitable manner as by means of rivets 7. The central collar 8 of the plate 5 is arranged to have a splined connection with a driven shaft extending into the gear box of the transmission in the usual manner. According to the present invention, I have incorporated a resilient driving connection between the plate 5 and the collar 8 by a certain novel hub construction indicated generally by the reference numeral 9 whereby to overcome the vibration which was otherwise incident to the operation of clutches of this general type which, as stated before, gave rise to noisy operation and eventual wear and tear in the motor. In the case of smaller motors particularly, this vibration was quite noticeable within the ordinary range of driving speeds. The elasticity introduced by the present invention has been found to eliminate these difficulties and the present construction has been found particularly advantageous by reason of the compactness, light weight, extreme durability, and comparative economy in production.

The hub structure 9 comprises an annular light sheet metal shell 10 riveted, as indicated at 11, with arcuate plates or blocks 12 to the plate 5 about a central opening 13 through which the collar 8 extends. The collar 8 is held in permanently assembled relation with the plate 5 by virtue of the inter-engagement of a plurality of teeth or spurs 14 radiating therefrom within the hub structure 9. These teeth, as shown in Fig. 1, engage between the blocks 12 leaving spaces between the same and the blocks, shown at 15, for the reception of flat leaf springs 16. The latter, it will be noted, are individually composed of a plurality of relatively thin leaf spring laminæ bunched together. In the present case, each of the springs 16 is composed of four laminæ instead of one heavy spring. It has been found that where one heavy spring will eventually break down under the severe hammering and sudden shocks of heavy driving, the laminated springs are practically indestructible for the present purpose. The springs are retained in position between the blocks 12 and the teeth 14 by a rim or flange 17 provided on the shell 10. It will be noted that the ends of the blocks 12 are formed convex, as shown at 18, and that the sides of the teeth 14 are formed concave and substantially complementary with the ends of the blocks 12, as shown at 19. The springs 16 span the concavity 19 and rest in engagement at their mid portions on the convex surfaces 18 practically without freedom of movement endwise or laterally within the spaces 15. When the springs 16 are inserted in the spaces 15, they are normally slightly deflected or bowed, as indicated, still leaving a slight clearance, as indicated at 20, to accommodate relative movement between the teeth 14 and the blocks 12 in operation, which is accompanied by a contraction or expansion of the springs 16 in an obvious manner. The slight normal deflection of the springs avoids any possibility of their resting loosely in the spaces 15 when the springs at the other ends of the blocks 12 are under compression. This would, of course, be detrimental to the noiseless operation of the clutch.

The operation of the clutch will, no doubt, be apparent from the foregoing description. Sudden accelerations and decelerations of the motor are accompanied with expansion and contraction of the springs 16 and smooth and noiseless operation is secured thereby. These springs come into play both when the drive is from the motor to the rear axle and vice versa and make the operation of the motor smoother and more quiet. In certain installations, the vibration period is raised to such an extent that no noise is developed except at very high speeds and there is thus no noticeable noise under ordinary driving conditions which, of course, is the desideratum. The present construction, it will be appreciated, is highly advantageous from the standpoints of its simplicity, durability, ease of assembling, and economy of production while affording the required lightness, what weight there is being kept as nearly as possible close to the axis of rotation to diminish inertia factors.

In the modified construction illustrated in Fig. 4 the collar 8 is provided with a plurality of plain rectangular lugs or teeth 14' engaging between the blocks 12' inside the annular shell 10 leaving spaces 15' therebetween in which relatively hard rubber pads or blocks 16' are held to afford a resilient driving connection between the collar 8 and the plate 5 in a manner similar to that afforded by the springs 16 between the blocks 12 and teeth 14 of the other construction. While this construction affords some of the advantages obtained by the other construction first described, it has been found that the other is far more practical under service conditions and will withstand the hardest driving.

It is believed that the foregoing conveys a clear understanding of the objects prefaced above, and, while I have illustrated certain preferred embodiments of my invention, it should be understood that some changes might be made in the design and arrangement of the parts without sacrificing certain of the advantages obtained by the present construction and without departing from the spirit and scope of the invention as explained in the appended claims, therefore:—

What I claim is:—

1. In a clutch plate, the combination of a central drive collar having a plurality of teeth radiating therefrom in equally circumferentially spaced relation, a plurality of blocks arranged to be fixed with said plate between the teeth of said collar, and said teeth and blocks providing complementary projections and recesses in spaced relation, a plurality of leaf springs fitting closely within the aforesaid spaces between said teeth and said blocks spanning said recesses and resting in engagement with said projections leaving a slight clearance at the aforesaid recesses for a relative movement of said teeth and blocks accompanied with a contraction and expansion of said springs; and a ring coaxial with said plate and riveted with said blocks to said plate, said ring having a peripheral circumferential flange extending toward said plate to enclose said blocks and the teeth of said collar with said leaf springs disposed therebetween, whereby to retain said collar in operative relation to said plate and to retain said leaf springs in operative relation between said teeth and said blocks.

2. In a clutch plate, the combination of a central drive collar having a plurality of teeth radiating therefrom in equally circumferentially spaced relation, a plurality of blocks arranged to be fixed with said plate between the teeth of said collar, and said teeth and blocks providing complementary projections and recesses in spaced relation, a plurality of laminated leaf springs fitting closely within the aforesaid spaces between said teeth and said blocks spanning said recesses and resting in engagement with said projections leaving a slight clearance at the aforesaid recesses for a relative movement of said teeth and blocks accompanied with a contraction and expansion of said springs, said springs being slightly deflected normally for the purpose herein specified, and a ring coaxial with said plate and riveted with said blocks to said plate, said ring having a peripheral circumferential flange extending toward said plate to enclose said blocks and the teeth of said collar with said springs disposed therebetween, whereby to retain said collar in operative relation to said plate and to retain said springs in operative relation between said teeth and said blocks.

3. In a clutch plate, the combination of a clutch collar centrally arranged with respect to said plate in a central opening provided therein, said collar having a narrow circumferential flange disposed alongside said plate on the one side thereof, said flange being notched to provide a plurality of circumferentially spaced drive teeth, a plurality of plates arcuate in form and of approximately the same thickness as said teeth and disposed within the notches between said teeth, there being spaces left between the ends of said plates and the sides of said teeth, the ends of said plates and the sides of said teeth being formed convex and concave in substantially complementary form, narrow leaf springs fitting in the spaces between the ends of said plates and the sides of said teeth arranged to be bowed upon relative movement between said teeth and said plates in operation, and an annular sheet metal shell riveted with said plates to said clutch plate having an annular inturned flange enclosing the peripheries of said plates and teeth and serving to retain said leaf springs in the spaces between said plates and teeth.

4. In a clutch plate, the combination of a clutch collar centrally arranged with respect to said plate in a central opening provided therein, said collar having a narrow circumferential flange disposed alongside said plate on the one side thereof, said flange being notched to provide a plurality of circumferentially spaced drive teeth, a plurality of plates arcuate in form and of approximately the same thickness as said teeth and disposed within the notches between said teeth, there being spaces left between the ends of said plates and the sides of said teeth, the ends of said plates and the sides of said teeth being formed convex and concave in substantially complementary form, narrow leaf springs composed individually of a plurality of thin laminæ bunched together fitting in the spaces between the ends of said plates and the sides of said teeth arranged to be bowed upon relative movement between said teeth and said plates in operation, and an annular sheet metal shell riveted with said plates to said clutch plate having an annular inturned flange enclosing the peripheries of said plates and teeth and serving to retain said leaf springs in the spaces between said plates and teeth.

5. In a power transmission element, a pair of members arranged to be connected to operate together with freedom for limited rotation of one with respect to the other, one of said members being provided with a drive tooth, the other of said members providing a casing to enclose the tooth and having a pair of abutments in said casing in front of and behind said tooth as respects the direction of relative rotation, the tooth and abutments providing driving parts, one of said parts being concave on its face, the other facing part being convex, and a leaf spring interposed between said parts spanning the concavity and resting in engagement with the convexity of said parts.

6. In a power transmission element, a pair of members arranged to be connected to operate together with freedom for limited rotation of one with respect to the other, one of said members being provided with a drive tooth, the other of said members providing a casing to enclose the tooth and having a pair of abutments in said casing in front of and behind said tooth as respects the direction of relative rotation, the tooth and abutments providing driving parts, one of said parts being concave on its face, the other facing part being convex, and a leaf spring interposed between said parts spanning the concavity and resting in engagement with the convexity of said parts, said spring having a slight initial deflection but being normally spaced at its mid point from the trough of the concavity to permit of further deflection.

7. In a power transmission element, a pair of members arranged to be connected to operate together with freedom for limited rotation of one with respect to the other, one of said members being provided with a plurality of drive teeth, the other of said members providing a casing to enclose the same and having pairs of abutments therein in front of and behind said teeth as respects the direction of relative rotation, the teeth and abutments providing driving parts, the one set of driving parts being convex on its opposite driving faces, the other set of parts being concave on its faces opposed to the other driving parts, and laminated leaf springs interposed between said parts on opposite sides of said teeth spanning the concavities and resting in engagement with the convexities, said springs having a slight initial deflection but being normally spaced at their mid points from the troughs of the concavities to permit of further deflection.

In witness of the foregoing I affix my signature.

MARTIN WILLENE.